May 11, 1971 H. P. SILVERMAN ET AL 3,578,409

SENSORS UNAFFECTED BY HUMIDITY CHANGES TO DETECT TOXIC OXIDIZING VAPORS

Filed Aug. 23, 1967

Herbert P. Silverman
Gino A. Giarrusso
INVENTOR.

BY [signature]
ATTORNEY

United States Patent Office 3,578,409

Patented May 11, 1971

3,578,409

SENSORS UNAFFECTED BY HUMIDITY CHANGES TO DETECT TOXIC OXIDIZING VAPORS

Herbert P. Silverman, Orange, and Gino A. Giarrusso, Long Beach, Calif., assignors to TRW Inc., Redondo Beach, Calif.

Filed Aug. 23, 1967, Ser. No. 662,663

Int. Cl. G01n *31/00, 31/06*

U.S. Cl. 23—254 5 Claims

ABSTRACT OF THE DISCLOSURE

A thin film of a metal such as iron, silver or copper being oxidizable to the extent of corrosion bonded to a non-corrodible backing and having a thin layer of a compound such as potassium chloride on at least a portion of the metal, the compound being adapted to prevent the formation of a passivating layer on the metal when exposed to oxidizing vapors and being adapted to permit continued oxidation of the metal; and an additive to said compound of a hygroscopic organic composition such as glycerol having been mixed with the compound in solution before coating the metal therewith.

BACKGROUND OF THE INVENTION

The invention relates to thin film sensors for detecting toxic oxidizing vapors and including a hygroscopic organic composition to prevent the effect of changes in humidity on the sensing capability of the sensors. It has been found that changes in humidity levels affect the response of thin film sensors considerably so as to make the correlation of response with toxic vapor concentration inaccurate.

This invention provides a constant humidity at or near the surface of the sensor so as to make more accurate correlation of vapor concentration and response. Stated differently, the present invention prevents the effect of changes in humidity on the response of the sensors to the oxidizing toxic vapors. Response is defined as a change in a metal film caused by contact with an oxidizing vapor and the response may be expressed as an electrical resistance change or as an exposure factor. Exposure factor is a numerical value derived from the resistance change and the initial resistance which approximates the amount of metal that has undergone a chemical change.

The maintenance of a constant humidity at the sensor surface is especially useful in dry areas or in the winter time when the humidity is very low. However, a constant humidity at the sensor's surface is needed at all times to achieve accurate correlation of the sensor's response and the oxidizing vapor concentration. Similarly, it is required, for the reasons stated above, to prevent the effect of changes in humidity levels on the sensor response.

The invention also provides a method for making sensing means, with or without the hygroscopic composition.

The known prior art is indicated in the following list of Letters Patent, Nos.: 2,285,663; 2,881,056; 3,108,342; 3,124,771; and 3,148,348.

SUMMARY OF THE INVENTION

This invention provides a rapid and accurate means for the detection of toxic oxidizing vapors as may be found in rocket propellants, such as nitrogen tetroxide ($N_2O_4$).

According to the invention, measurement of the oxidizing vapors can be made within a few minutes with a relatively simple, inexpensive, lightweight, highly-sensitive and portable sensing instrument. The invention may be made in the form of a thin film sensitized badge that can be worn by personnel and the measuring instrument can be carried in a pocket of worn on a belt to effect a portable warning device for personnel in areas of possible contamination by toxic oxidizing vapors.

A complete sensor assembly for detecting toxic oxidizing vapors, according to the invention, may be comprised of a vacuum-deposited thin film of a metal, such as silver, copper or iron, to form a conductive electrical pathway on an inert, non-conductive substrate. The pathway may be constructed so as to form two legs of a Wheatstone bridge when connected to a suitable instrument. One leg of the film is coated with an inert and impervious coating or tape, such as silicone rubber, vinyl tape, or acrylic plastic. The leg to be exposed is sensitized by coating it with an appropriate compound which is adapted to prevent the formation of a passivating layer on the metal when exposed to oxidizing vapors and being further adapted to permit continued oxidation of metal from the film by corrosion.

The legs are connected to the measuring instrument, which is basically a Wheatstone bridge with an amplifier and readout circuits. When an oxidizing vapor contacts the sensitized leg, the sensitizing compound acts as stated above, permitting continued oxidation of the metal. The corrosion of the metal increases the resistance of that side of the bridge so as to unbalance the bridge circuit. This unbalance is detected by the instrument and is shown on an ammeter or a galvanometer. The amount of unbalance shown is the measure of the amount of oxidizing vapor present in the ambient atmosphere. For the purpose of this invention, corrode is defined as the gradual conversion of metal to non-metallic forms.

The appropriate sensitizing compound above is selected from the group including sodium chloride, potassium chloride, potassium bromide, potassium chloride with a smaller amount of ammonium chloride, and potassium hydroxide.

It has been surprisingly found that the addition to the sensitizing compound of the hydroscopic organic composition, such as glycerol, ethylene glycol and propylene glycol, maintains a constant humidity at the sensor surface in dry areas and, further, prevents the sensor from being affected by substantial or slight changes in humidity levels.

It has been surprisingly found that a very effective way of sensitizing the thin metal films described above can be achieved by dipping the inert strip and the metal film bonded thereon into a solution of a volatile organic solvent and a sensitizing compound, having at least 0.1% by weight of the compound dissolved in the solution, and after removing from the solution, allowing the excess liquid to drain for a few seconds, then flash drying by placing the strip in a stream of hot air, having a temperature range of 80° to 130° C., discharged from a heat gun.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENT

Figure 1:
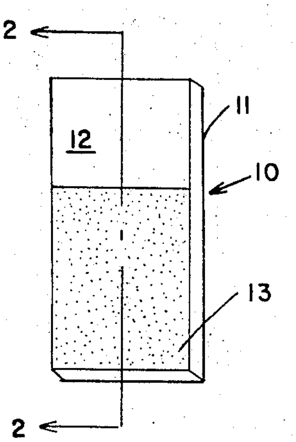
FIG. 1 is an elevational view of a sensitized strip for detecting oxidizing vapors according to the invention.
Figure 2:
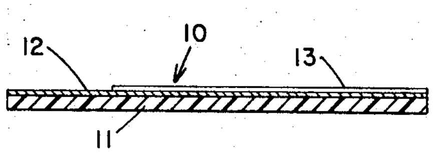
FIG. 2 is a cross-sectional view, taken as indicated along the lines 2—2 of FIG. 1.

Referring again to the drawings, there is shown in FIGS. 1 and 2, a sensitized strip, generally designated as 10. The strip is comprised of a non-corrodible substrate portion 11 extending for the full length thereof, a thin film of a metal 12, such as silver, iron or copper, bonded to the part 11 and a sensitized portion 13 of a thin layer of a compound formed on the metal. The substrate portion 11 is inert and nonconductive and has the approximate size of 1½ x 1¹⁄₁₆ x ¹⁄₁₆ inches. The material for the substrate 11 may be, for example, phenolic plastic circuit board material, vinyl resins or polystyrene.

The metal film 12 is deposited on the substrate in a vacuum chamber which is evacuated until there is no longer any significant gassing of the phenolic substrate, for example, and a steady pressure of $10^{-4}$ mm. of mercury is obtained. The metals used to make the films were evaporated from a tungsten wire filament onto the surfaces of the substrate where they condensed to produce the metal films.

The thickness of the metal film 12 has been varied from 100 to 10,000 angstrom units. By varying the thickness of the metal used in the sensitized strips, a wide range of sensitivity can be achieved. By using a metal film of 0.004 inch thick, for example, an environment that will cause loss of 10 mils per year will cause a change of one micro-inch per hour, which can be usually monitored by commercially available instrumentation. By decreasing the initial metal thickness, by using for example, very thin metal films, 1,000 angstroms or less in thickness, a metal loss corresponding to a billionth of an inch can be measured.

To apply the sensitizing compound 13 mixed with the hygroscopic organic composition on the metal film 12, the strips were, at first, either dipped into an aqueous solution of the mixture or the mixed aqueous solution was sprayed upon the metal and the mixed layer was permitted to be formed by air drying. However, it was discovered that if the strips were dipped into a solution of a volatile organic solvent in which the mixture had been dissolved, after which the excess solution was allowed to drain off slowly for about three to five seconds, and then the solution was flash dried by placing it in an air stream having a temperature range of from 80° C. to 130° C. from a heat gun for approximately five seconds, an excellently sensitized strip was formed. The layer 13 was very thin and smooth and was tightly secured to the metal film. This method formed the most uniform appearing surfaces and produced the most sensitive films. It also proved to be the most convenient method to use in sensitizing large quantities of films.

The use of the aqueous solutions of the mixture and which were air dried resulted in uneven drying, leaving spots or rings of uneven mixture deposited on the films that became visible after the mixture had been exposed to some toxic oxidizing materials.

The organic solvents used were methanol, ethanol, isopropanol and dioxane. The substitution of the organic solvents, particularly methanol, for water, resulted in an increase in sensitivity, which is believed to be due to the formation of smaller, more evenly distributed crystals of the dissolved compound on the metal film.

The following examples illustrate the method for sensitizing the metal films, bonded to the ¹⁄₁₆ inch phenolic plastic circuit board. The thicknesses of the metal films were approximately 2,000 angstrom units.

Example I

Separate solutions were prepared by dissolving from 0.1 to 2 grams of one of the following compounds in water: sodium chloride, potassium chloride, potassium bromide and potassium hydroxide mixed with from 0.5% to 10% by volume of one of the following hydroscopic organic liquids: glycerol, ethylene glycol and propylene glycol. The solution consisted of 100 grams, from 90% to 99.5% of the volume being water. Phenolic strips with a silver film bonded thereto were each dipped in one of the solutions or sprayed with one of the solutions and then permitted to dry in the ambient air. Each strip, when dried, had been sensitized.

Example II

Phenolic strips with a silver metal film bonded thereon, as described above, were dipped in or sprayed with a solution prepared by dissolving two grams of potassium chloride and 0.2 gram of ammonium chloride in a 100 gram solution, consisting of 10% glycerol and 90% methanol by volume. After spraying or removing from the solution, each strip was permitted to dry in the ambient air.

Example III

Separate sensitizer solutions were prepared (from each of the following possible combinations) from 0.1% to 2% by weight of one of the sensitizers: sodium chloride, potassium chloride, potassium bromide, and potassium hydroxide; and from 0.5% to 10% by volume of one of the hygroscopic organic compounds: glycerol, ethylene glycol, and propylene glycol and from 90% to 99.5% by volume of methanol. Phenolic strips with silver films bonded thereon were dipped, one in each of the methanol solutions. After removal from the solution, the excess liquid was allowed to drain off slowly for about three to five seconds and then the solution was flash dried on the respective strips in an air stream in a temperature range of between 80° to 130° C. from a heat gun for approximately five seconds.

Example IV

Sensitizing solutions were prepared from 0.1% by weight to the volume of a solution of potassium chloride in methanol, having 0.5% by volume of glycerol. Phenolic strips with silver film bonded thereon were dipped in the solution. After removing from the solution, the excess liquid was allowed to drain off slowly for about three to five seconds and then the solution was flash dried on the strips in an air stream in a temperature range of between 80° to 130° C. from a heat gun for approximately five seconds.

The strips sensitized in accordance with the foregoing examples were each exposed to nitrogen tetroxide, the latter gas being mixed with air for various respective tests in 10, 30, 50, 100 and 1,000 parts per million. Where the toxic vapors were present in the air to the extent of 1,000 parts per million, the flow rate of the gaseous mixture was 0.18 meter per minute and when the toxic gas was present in the range between 10 parts per million and 100 parts per million, the gas flow rate was 1.8 meters per minute. The tests were made at 70° F. and at various levels of relative humidity in the ranges of 10% to 90%.

It was surprisingly found that when glycerol, ethylene glycol or propylene glycol was added to the sensitizing solution, the effect of the humidity on the response of the sensors to nitrogen tetroxide was reduced from a 60% change in response between 10% and 50% relative humidity to only a 30% change.

The table below is a summary of response data of silver films exposed to nitrogen tetroxide when glycerol was and was not added to a sensitizing solution containing 0.1% by weight of potassium chloride for various relative humidities, the response of being in exposure factor units. Where the glycerol was not added, the solvent was water, and where it was added, the solvent was methanol, with glycerol being present in the amount of 0.5% by volume.

| $N_2O_4$ (p.p.m.) | Glycerol added: Response | Mean | Response | Mean | No glycerol added: Response | Mean | Response | Mean | Relative humidity (percent) |
|---|---|---|---|---|---|---|---|---|---|
| | 5 minutes exposure | | 10 minutes exposure | | 5 minutes exposure | | 10 minutes exposure | | |
| 10 | 6.6<br>10.9 | 8.8 | 25.5<br>24.9 | 25.2 | 5.0<br>4.2 | 4.6 | 8.6<br>7.2 | 7.9 | 50 |
| 10 | 14.9<br>11.6 | 13.2 | | | 13.1<br>13.9 | 13.5 | | | 90 |
| | 3 minutes exposure | | | | 3 minutes exposure | | | | |
| 50 | 16.8<br>27.7 | 23.0 | | | 15.9<br>20.7 | 18.3 | | | 10 |
| | 4 minutes exposure | | | | 4 minutes exposure | | | | |
| 30 | 33.2<br>32.0 | 32.6 | | | 20.2<br>14.0 | 16.9 | | | 10 |
| | 3 minutes exposure | | | | 3 minutes exposure | | | | |
| | 39.3<br>31.1 | 35.2 | | | 24.0<br>44.0 | 34.0 | | | 50 |

It is seen in the above table that the responses at 50% were relatively the same for five minute exposures but that for ten minute exposure at the same humidity, the response where the glycerol was added was considerably greater. For a 10% relative humidity, the response was substantially greater where the glycerol was added and that where the glycerol was not added, the response was substantially less at 10% relative humidity than at 50%.

At low concentrations of the nitrogen tetroxide, as 10 parts per million, it has been discovered that the exposure factor apparently goes through a minimum at 50% relative humidity, as may be seen in the above table. The exposure factor at 50% relative humidity is less than that at 10% for 10 parts per million, not shown in the table, and less than that for 90% relative humidity. This anomalous behavior suggests the possibility that there are two mechanisms by which nitrogen tetroxide can attack a metal film, and that the preferred mechanism depends upon the availability of water. At 90% relative humidity for ten parts per million of the toxic gas, the response is substantially the same, with or without glycerol. Thus, it is seen that the problem areas are in the lower humidities and that the glycerol substantially increased the response where the humidity was 10%.

Figure 3:
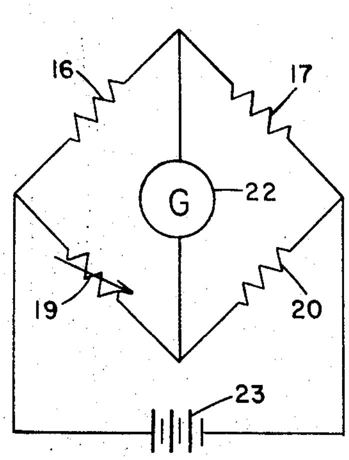
FIG. 3 is a Wheatstone bridge electrical circuit diagram illustrating means for incorporating a sensitized strip accarding to the invention into a resistance-measuring circuit.

The sensitized strips are adapted for use in systems designed to measure oxidation of the metal films to the extent of corrosion due to toxic vapors on a continuous basis. In FIG. 3, there is illustrated a system incorporating a Wheatstone bridge circuit. This illustrates when there is a resistance unbalance due to oxidation of one of the test elements in an oxidizing atmosphere. The elements are the same construction but one is treated with a sensitizer with a hygroscopic organic compound added, as indicated above, and the other is protected by means of a suitable coating such as silicone rubber, vinyl tape, acrylic plastic, Scotch cellophane tape and Mystic Tape, so that it is not affected by the oxidizing elements in the air.

In the circuit diagram in FIG. 3, a sensitized strip 16 is used as the electrical resistance shown, and it is subjected to the oxidizing atmosphere. The reference resistance 17 contains the same type of metal film as the resistance 16, but it is provided with a coating to prevent an oxidizing attack on the metal film. The resistances 16 and 17 are disposed in the oxidizing atmosphere, forming two arms of the bridge circuit which also include a variable resistor 19 and a fixed resistor 20. A potential is applied, as by means of a battery 23 between the opposed legs of the bridge circuit and a sensing device, such as a galvanometer 22, disposed between the opposite legs of the bridge. When the oxidation occurs to the sensitized resistance 16, the increase in electrical resistance caused by the corrosion of the metal film is detected continuously by adjusting the variable resistor 19 until there is no current flow in the galvanometer 22. The variable resistor 19 can be calibrated in regard to oxidation to give a continuous indication of the amount of oxidation which has occurred.

Figure 4:
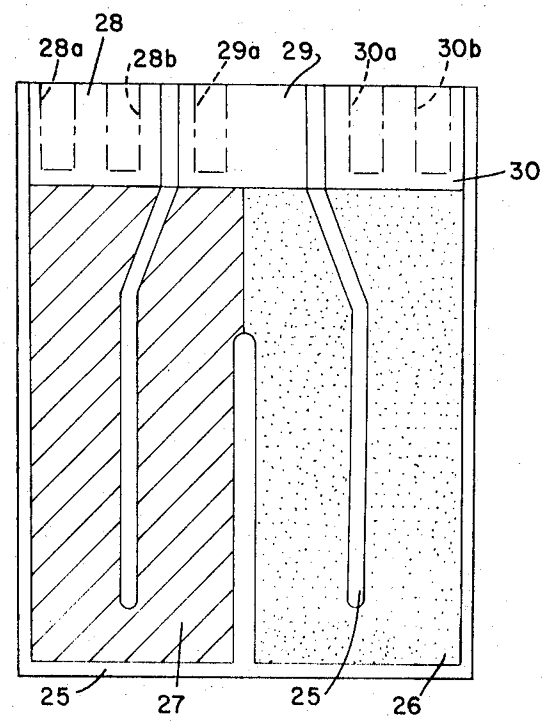
FIG. 4 is a plan view of a senor according to the invention incorporating the principle of the bridge circuit illustrated in FIG. 3.
Figure 5:
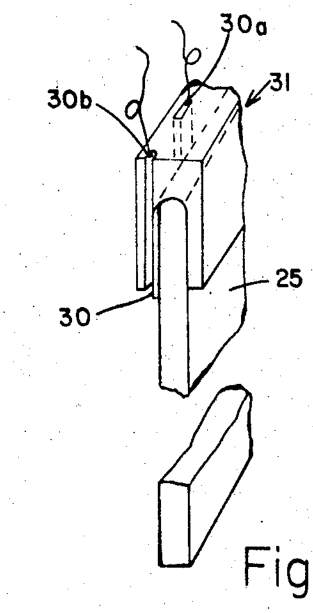
FIG. 5 is a fragmentary perspective view illustrating one end of the sensor in FIG. 4., and having a connector attached.

In FIGS 4 and 5, there is illustrated a form of probe which is particularly adapted for use in the type of circuit shown in FIG. 3. A backing 25 composed of a material such as phenolic plastic has deposited on it an extremely thin film over the metal such as silver, iron or copper. The film is divided into an unprotected sensitized leg 26 and an unsensitized reference leg 27 having a coating of an impervious material such as Scotch cellophane tape. Electrical connections to the respective legs are provided by copper tabs 28, 29 and 30. A female connector 31, shown in FIG. 5, has metal spring contacts **28*a*, 28*b*, 29*a*, 30*a* and 30*b* which are provided for proper attachment to the metering apparatus and completion of the bridge circuit. These contacts fit on the tabs 28, 29 and 30** as shown by the phantom lines in FIG. 4 to make the proper connections.

The current carrying contacts **28*a* and 30*b*, as shown in FIG. 4, make contact to tabs 28 and 30. For determining the resistance ratio between the oxidizable leg 26 and the reference leg 27, the contacts 28*b*, 29*a* and 30*a* are used to compare voltage drops across the two legs 26 and 27. In order to check the integrity of the reference element, a check element is provided by the area of the leg 27. In making the check, the contacts 28*a*, 28*b*, and 29*a* are switched into the metering circuit and as long as the resistance ratio between the two points is constant, there is an assurance that the coating on the reference leg 27** is protecting that element from the oxidizing action of the toxic vapors. When the sensitized leg is corroded, the resistance is increased, resulting in the unbalance of the voltage between the two legs.

The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefore described as being merely by way of example. We do not wish to be restricted to the specific forms shown or uses mentioned except as defined by the accompanying claims, wherein various portions have been separated for clarity of reading and not for emphasis.

What is claimed is:

1. A sensitized strip for detecting oxidizing vapors which comprises a thin-film of a corrodible metal bonded to a noncorrodible backing; said corrodible metal film being at least partially coated with a layer of sensitizer; said sensitizer consisting essentially of a halogen-containing inorganic salt and an effective amount of a hygroscopic polyhydroxy alcohol.

2. The sensitized strip of claim 1 further characterized in that the inorganic salt is selected from the group consisting of sodium chloride, potassium chloride, potassium bromide, potassium hydroxide, and an admixture of potassium chloride with ammonium chloride.

3. The sensitized strip of claim 1 further characterized in that the corrodible metal is selected from the group consisting of iron, copper and silver.

4. The sensitized strip of claim 1 further characterized in that the hygroscopic polyhydroxy alcohol is selected from the group consisting of glycerol, ethylene glycol, and propylene glycol.

5. In a sensor-test assembly comprising a test specimen adapted to be oxidized by vapors comprising a non-corrodible reference specimen, an electrical-bridge circuit including said specimens and means for detecting an unbalance in said bridge circuit; the improvement which comprises (a) a test specimen comprising a thin film of a metal selected from the group consisting of iron, silver and copper bonded to a non-corrodible backing; (b) at least a portion of said metal film being coated with a sensitizer consisting essentially of an inorganic salt selected from the group consisting of sodium chloride, potassium chloride, potassium bromide, potassium hydroxide, and potassium chloride admixed with small amounts of ammonium chloride and an effective amount of a hygroscopic polyhydroxy alcohol selected from the group consisting of glycerol, ethylene glycol, and propylene glycol.

References Cited

UNITED STATES PATENTS

| | | | |
|---|---|---|---|
| 2,454,584 | 11/1948 | Zingaro | 338—35 |
| 2,606,102 | 8/1952 | Cook | 23—254 |
| 2,687,342 | 8/1954 | Strange et al. | 23—232(E) |
| 3,124,771 | 3/1964 | Rohrback | 338—13 |
| 3,148,348 | 9/1964 | Rohrback | 338—13 |

JOSEPH SCOVRONEK, Primary Examiner

B. S. RICHMAN, Assistant Examiner

U.S. Cl. X.R.

23—232; 73—27; 338—13, 34, 35